United States Patent Office 3,382,050
Patented May 7, 1968

3,382,050
STABILIZED HYDRAZINE BIS-BORANE
James E. Coleman, Metuchen, N.J., assignor to Esso Research and Engineering Company, a corporation of Delaware
No Drawing. Filed Feb. 1, 1961, Ser. No. 86,547
3 Claims. (Cl. 23—358)

This invention is concerned with a controlled heat treatment of impure hydrazine bis-borane, $$H_3B \cdot N_2H_4 \cdot BH_3$$

for improving its stability with only slight change in its composition and in its effectiveness as a monopropellant.

Hydrazine bis-borane, abbreviated HBB, is of interest as a solid propellant for rocket motors. It has a high specific impulse ($I_{sp}$) and forms a large volume of gas at a relatively low flame temperature, as a monopropellant. It is useful as a hydrogen-rich fuel ingredient in propellant systems that employ fluorine and/or oxygen oxidizers and need a driving fluid provided by HBB. Thermal stability of impure HBB, however, has caused concern about its practicability.

Although significant improvements have been made in the manufacturing process of HBB to obtain a product of improved thermal stability, the present invention provides a method of treatment for giving the HBB product even greater stability and for correcting for any deficiencies in the synthesis controls. This treatment can be used for restoring stability after a period of storage in which the HBB is contaminated by impurities that make the HBB less stable.

The lowering of stability of HBB has been observed to be promoted by the presence of small amounts of contaminants, some of which may be imparted in the synthesis, and some, such as moisture, by absorption. A kinetic study of HBB degradation indicates that trace impurities promote the decomposition and thus accelerate the decomposition further.

In accordance with the present invention, the heat treatment for improving stability of HBB is carried out at a moderate temperature in the range of 60° to 130° C. in a dry inert atmosphere or vacuum for a suitable time indicated by a limiting of the decomposition rate, maximum decomposition permissible, or both.

The heat treatment of the HBB at moderate temperatures causes decomposition that results in hydrogen gas evolution and the formation of hydrazino bis-borane polymer. It is evident from data that impurities accelerate this decomposition but at the same time they are eliminated or converted to materials which do not catalyze the decomposition during the heat treatment.

The percent decomposition of the HBB during the heat treatment is determined from the amount of gas evolved and on the basis that HBB is decomposed according to the reaction equation:

$$H_3B \cdot N_2H_4 \cdot BH_3 \xrightarrow{\Delta} \frac{1}{x}(H_2B \cdot N_2H_2 \cdot BH_2)_x + 2H_2$$

Thus, for each 2 mols of gas formed, one mol of HBB is converted to hydrazino bis-borane. This is an approximation because other reactions occur, particularly such due to impurities, to some extent.

The efficacy of the controlled heat treatment is illustrated by the following examples. The heat treatments were conducted at 95° C. in a vacuum system, i.e. pressures of 0.05 to 600 mm. Hg abs. The rate of decomposition was followed by gas measuring technique.

HEAT TREATMENT OF HBB AT 95° C.

| Time of Treatment Hours | Rate of Decomposition Standard cc. of Gas/Hr./Gr. | Percent Decomposed |
|---|---|---|

Example I. HBB prepared by reaction of excess hydrazine sulfate with sodium borohydride—followed by n-pentane precipitation

| | | |
|---|---|---|
| 0 | 16.3 | 0 |
| 4.2 | 3.65 | 4.02 |
| 10 | 2.06 | 6.06 |
| 20 | 1.20 | 8.16 |

Example II. Commercial sample after vacuum drying

| | | |
|---|---|---|
| 0 | 17.9 | 0 |
| 5 | 1.32 | 1.97 |
| 22 | 0.66 | 4.01 |
| 80 | 0.40 | 7.90 |

Example III. Prepared as in Example I, but in dioxane solution

| | | |
|---|---|---|
| 0 | 11.45 | 0 |
| 4 | 1.50 | 2.12 |
| 25 | 0.55 | 3.93 |
| 98 | 0.34 | 7.94 |

Example IV. Prepared as in Example I, but washed with dioxane

| | | |
|---|---|---|
| 0 | 0.95 | 0 |
| 20 | 0.31 | 0.94 |
| 60 | 0.15 | 1.63 |
| 120 | 0.07 | 2.44 |

The variation in initial rate of decomposition is an indication of the variation in impurities present. For instance, an efficiently prepared dioxane washed HBB product, such as treated in Example IV, may need little or no heat treatment for stabilization; and if it is heat treated, suffers little degradation in composition or $I_{sp}$. A minimum of heat treatment for stabilization is highly desirable to obtain the advantages of the high $I_{sp}$ value of HBB of about 282, as compared to the $I_{sp}$ value of only 240 for its degradation product.

In general, a heat treatment for stabilization is desirable when the HBB containing contaminants has a rate of decomposition amounting to more than 0.6 cc. of gas/hr./gram at 95° C. Accordingly, a heat treatment giving less than approximately 5% decomposition of HBB is generally adequate. After the initial 5% decomposition (or less for higher purity HBB), the decrease in rate of decomposition is very small.

The preferred conditions for the heat treatment are temperatures of 80° to 120° C. to lower the heating time and a sufficient time to make the rate of decomposition due to impurities adequately low. Higher temperatures should be avoided due to the autoignition tendency of HBB. In the heat treatment, at temperatures near 130° C. and higher, autoignition tends to occur. Vacuum is applied or dry inert gas is used to maintain anhydrous conditions. Thus the amount of decomposition in the heat treatment is kept down in the range of 1 to 5 wt. percent of the HBB treated.

The amount of stabilization required may vary, e.g. depending on further handling or storage requirements. However, in general, the stabilization is adequate when the rate of decomposition amounts to less than 0.6 cc. standard condition gas evolved per hour per gram of the impure HBB heated at 95° C. as in the stabilization treatment. Then, the stabilized HBB should contain only about 0.1 to 5 wt. percent of hydrazino bis-borane with slight traces of impurities of greatly reduced tendency to promote decomposition and have an $I_{sp}$ of at least 280.

The use of the stabilization treatment decreases undesirable decomposition during compounding, allows use of higher temperatures during compounding, increases storage life and allows for safer operation. It is a safeguard in handling, particularly for minimizing decomposition from an accidental or incidental temperature rise.

What is claimed is:
1. Method of stabilizing hydrazine bis-borane that contains a small amount of impurities which promote decom- position of the hydrazine bis-borane, which comprises heat treating the hydrazine bis-borane containing said small amount of impurities under anhydrous conditions to evolve gas at a low rate of about 0.6 to 17.9 standard cc. of gas per hour per gram of the hydrazine bis-borane heated to a temperature in the range of about 80° to 120° C. until approximately 0.1 to 5 wt. percent of the hydrazine bis-borane is converted to hydrazino bis-borane, removing resulting decomposition gas at a measured rate of its evolution and recovering the resulting stabilized hydrazine bis-borane containing about 0.1 to 5 wt. percent hydrazino bis-borane with slight traces of contaminants that cause decomposition at a rate of less than 0.6 cc. of standard gas per hour per gram of the thus stabilized hydrazine bis-borane at 95° C.

2. The method of claim 1, wherein anhydrous conditions are obtained and decomposition gas is removed by passing a dry inert gas over the hydrazine bis-borane undergoing said heat treatment.

3. The method of claim 1, wherein the anhydrous conditions are obtained and gas evolved is removed by applying a vacuum to the hydrazine bis-borane undergoing said heat treatment.

References Cited

Steindler et al., "J. Amer. Chem. Society," vol. 75, page 756, Jan. 3, 1953.

Emeleus et al., Nuclear Science Abstracts, page 734, No. 4680 (1951).

MILTON WEISSMAN, *Primary Examiner.*

CARL D. QUARFORTH, L. DEWAYNE RUTLEDGE, *Examiners.*

R. D. MORRIS, J. D. VOIGHT, R. L. GRUDZIECKI, *Assistant Examiners.*